L. H. BRIGHTMAN.
BOLT HEAD AND PROCESS OF MAKING SAME.
APPLICATION FILED AUG. 5, 1914.
1,139,479.
Patented May 18, 1915.
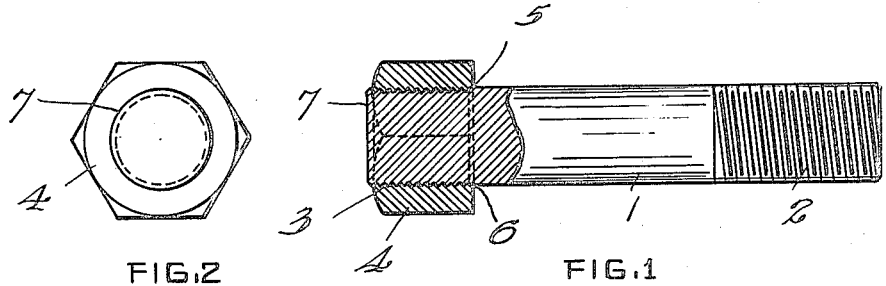
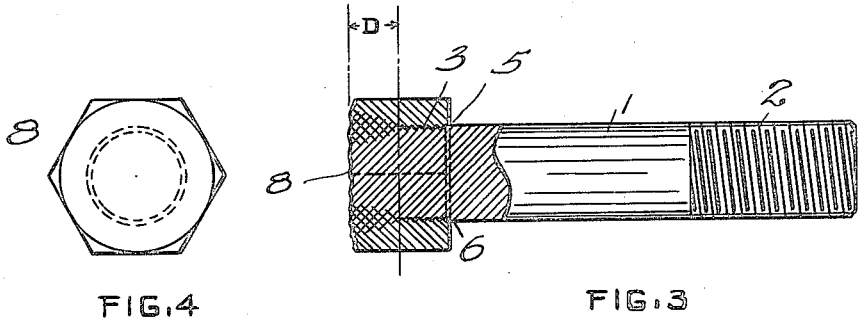
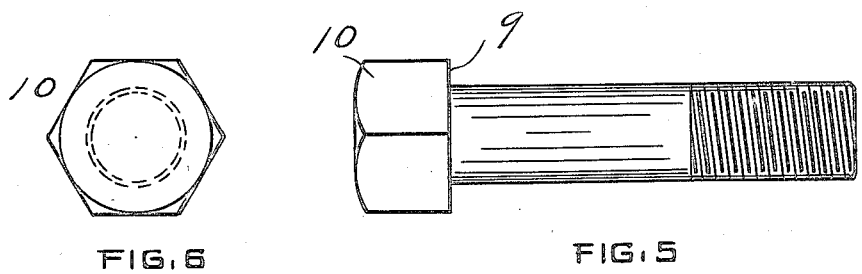
Inventor
LATHAM H. BRIGHTMAN

UNITED STATES PATENT OFFICE.

LATHAM H. BRIGHTMAN, OF COLUMBUS, OHIO.

BOLT-HEAD AND PROCESS OF MAKING SAME.

1,139,479.  Specification of Letters Patent.  Patented May 18, 1915.

Application filed August 5, 1914. Serial No. 855,194.

*To all whom it may concern:*

Be it known that I, LATHAM H. BRIGHTMAN, a citizen of the United States of America, residing at Columbus, in the county of Franklin and State of Ohio, have invented certain new and useful Improvements in Bolt-Heads and Processes of Making Same, of which the following is a specification.

The present invention relates to improvements in bolt heads and the process for making the same.

The primary object of the invention is to cheapen the cost of production of bolt heads and bolts, reduce the cost of material required in the construction of a bolt, and manufacture a substantial and durable bolt by forming the finished product of two cheap or standard parts, as a stud and nut, and thus furnishing a bolt head connection of great strength and durability.

In the manufacture of bolts, cap screws and the like, especially in high grade finished products, the usual manner has been to turn down the stud portion of the bolt from a bar the size and shape of the required finished head. This process and manner of making the bolt has proven very costly on account of time required and waste of material, especially in long, large, or special size bolts. By screwing a nut onto a threaded stud and welding the threaded nut and stud, I am enabled to produce a bolt at a comparatively cheaper cost in time, labor, and material, and the bolt thus made is actually as strong in the head construction as the stud or bolt portion itself.

In the accompanying drawings I have illustrated one complete example of the physical embodiment of my invention, showing the steps in the process of formation of the headed bolt, according to the best mode I have so far devised for the practical application of the principles of my invention.

Figure 1 shows the first step of my process of making the bolt, a threaded stud having a nut screwed tight thereon, and both parts broken in section to illustrate the threaded connection. Fig. 2 is an end view showing the nut on the stud. Fig. 3 shows the same stud and nut, in the same manner, but after the parts have been electrically welded by the "spot welding" or torch process. Fig. 4 is an end view of Fig. 3. Fig. 5 is a side view of the completed bolt with its head thereon. Fig. 6 is an end view of Fig. 5.

The stud or bolt 1 is threaded at 2 in usual standard style, and in addition to the one threaded end, the other end of the stud is threaded as at 3. Preferably the threads 3 are smaller than the standard threads 2 in order to maintain the greatest diameter of the bolt in the head to secure greatest strength. The nut 4 is of standard make with threads to fit the threads 3 on the stud. At 5 the opening in the nut is counterbored so that when the nut is turned tight upon the stud as in Fig. 1, the shoulder 6 of the stud will enter the counterbore in the nut, thus preventing the appearance of a thread or a line at the juncture of the stud with the nut. Preferably the end of the stud projects slightly through the nut as at 7, and this material forms stock for welding and for squaring up the head.

After the nut has been turned onto the stud as in Fig. 1, the parts are electrically welded together, preferably by the utilization of a spot welder, or torch, of standard type. The extent of the weld as indicated between the two lines "D" in Fig. 3, depends materially upon the size of the bolt and the time the parts are subjected to the welding process, but this extent and the required time are determined and varied to suit different conditions and purposes.

During the welding process, as the metal of the stud and nut become melted and fused, the outer face of the head becomes roughened or mutilated, as indicated at 8 Fig. 3, but as the head is completed in the finishing machine, this irregularity is eliminated. The mutilated bolt head is placed in the customary machine for forming or finishing the head which forms it to any standard, special or other size or shape as required. This machine also corrects any irregularities that may develop, and trues up or squares the face 9 of the completed head 10 should this be necessary. In this manner a combined threaded and welded head is provided for the bolt, and by my process of making the bolt head I have found that a decided saving in labor, material, time and convenience is accomplished, and especially is this so for large size finished products, which as before stated, in many instances require to be turned down from stock the size and shape of the finished head.

I claim:—

1. The process of making a headed bolt which consists in screwing tight a threaded nut on a threaded stud and leaving a portion of the stud projecting to form material for finishing the head of the bolt, welding the parts together at the threaded joint, and finishing the head by utilizing the material of the projecting stud while soft from the heat of welding to finish the bolt head.

2. The process of making a headed bolt which consists in screwing tight a threaded counterbored nut on a threaded stud so that the plane surface of the stud below the threads will enter the counterbore, and welding the parts together.

3. The process of making a headed bolt which consists in screwing tight a threaded and counterbored nut on a threaded stud so that a portion of the plane surface of the stud below the threads will enter the counterbore and a portion of the stud project through the nut, welding the parts together at the thread junctures, and finishing the head by utilizing the projecting material of the stud while soft from the heat of welding.

In testimony whereof I affix my signature in presence of two witnesses.

LATHAM H. BRIGHTMAN.

Witnesses:
H. M. BRIGHTMAN,
C. M. SHIGLEY.